(12) United States Patent
Guo et al.

(10) Patent No.: US 7,672,407 B2
(45) Date of Patent: Mar. 2, 2010

(54) MITIGATION OF INTERFERENCE FROM PERIODIC NOISE

(75) Inventors: Yongfang Guo, Sunnyvale, CA (US); Xintian E. Lin, Mountain View, CA (US); Qinghua Li, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 856 days.

(21) Appl. No.: 11/476,365

(22) Filed: Jun. 27, 2006

(65) Prior Publication Data

US 2007/0297521 A1 Dec. 27, 2007

(51) Int. Cl.
*H03D 1/04* (2006.01)
(52) U.S. Cl. .................. 375/346; 375/260; 375/340; 375/343
(58) Field of Classification Search .............. 375/340, 375/343, 346
See application file for complete search history.

(56) References Cited

U.S. PATENT DOCUMENTS

| 5,974,101 A * | 10/1999 | Nago .......................... 375/350 |
| 6,647,367 B2 * | 11/2003 | McArthur et al. ........... 704/226 |
| 2003/0002590 A1 * | 1/2003 | Kaku et al. .................. 375/285 |
| 2005/0123071 A1 * | 6/2005 | Okada et al. ................. 375/316 |

* cited by examiner

*Primary Examiner*—David C Payne
*Assistant Examiner*—Leon Flores
(74) *Attorney, Agent, or Firm*—Blakely, Sokoloff, Taylor & Zafman LLP (57) ABSTRACT

A method and apparatus for mitigation of interference from periodic noise. An embodiment of a method includes receiving wireless signal data, where the data includes a periodic noise that varies in frequency over time. The method further includes performing a time-spectrum characterization of the data, and correlating the time-spectrum characterization of the data to determine a period of the periodic noise. The noise is dynamically weighted based at least in part on frequency variation of the noise.

19 Claims, 9 Drawing Sheets

MITIGATION OF INTERFERENCE FROM PERIODIC NOISE

FIELD

An embodiment of the invention relates to computer operations in general, and more specifically to mitigation of interference from periodic noise.

BACKGROUND

In computer development, the increasing miniaturization of devices together with the integration of multiple functions has led to embedding certain devices into units which were previously separate. While providing great benefits in device flexibility and operation, the embedding of devices may result in certain results that were not previously noticed or present in earlier devices.

In one example, a radio receiver may be embedded into computer systems. In particular, a WLAN (wireless local area network) receiver may be embedded into the platform of a device such as laptop or handheld computer. Because of the proximity to other devices and modules, noise from the platform may be found in the WLAN signal, thereby degrading radio receiver performance.

In particular, a receiver may receive noise from clocks or similar elements on the platform. For example, a frequency modulated (FM) spread clock may create noise in a periodic pattern, including harmonics that cause interference with operations of a WLAN receiver that is embedded into the device. As a result of this colored noise (noise having certain frequency components, as opposed to white noise), the performance of the receiver may be compromised. However, conventional devices do not provide any effective manner of addressing the resulting interference.

BRIEF DESCRIPTION OF THE DRAWINGS

The invention may be best understood by referring to the following description and accompanying drawings that are used to illustrate embodiments of the invention. In the drawings.

DETAILED DESCRIPTION

A method and apparatus are described for mitigation of interference from periodic noise.

As used herein, "clock signal" means a regularly occurring or repeating signal, including a signal intended to synchronize or time operations for a system, apparatus, module, or component.

As used herein, "wireless receiver" means any receiver intended to receive radio signals, including, but not limited to a WLAN (wireless local area network) receiver operating pursuant to IEEE 802.11 (including 802.11a, 801.11g, and 802.11n).

As used here, "OFDM" or "orthogonal frequency division multiplexing" means an FDM (frequency division multiplexing) modulation technique for transmitting digital data over a radio wave. OFDM works by splitting the radio signal into multiple smaller sub-signals that are then transmitted simultaneously at different frequencies to the receiver. For example, 802.11a WLAN, 802.16 and WiMAX technologies use OFDM.

As used herein, "spectrogram" is generally a graphical representation of a frequency spectrum. A spectrogram may represent a short time Fourier transform (STFT) of a window of data.

In an embodiment of the invention, periodic noise is mitigated in a device or system. The noise may be noise that changes in frequency over time in a periodic pattern. The noise may represent platform noise received by a receiver that is embedded in the platform, such as a wireless network receiver (such as WLAN receiver) embedded in a laptop or portable computer or similar electronic device. In one embodiment of the invention, the effect of recurring platform noise, such as noise related to a frequency modulated clock signal, in interfering with a receiver is mitigated by a process of performing a time-spectrum characterization of the platform noise; tracking the noise signal using correlation; estimating the time domain receive channel or band that is affected; and providing dynamic noise weighting to counter the dynamic noise signal.

In electronic devices, a computer clock may generate noise that interferes with certain radio reception on the computer platform. Specifically, the operation of a frequency modulated (FM) spread clock may provide significant noise in a WLAN band and thus interfere with WLAN receiver operations. Clock spreading is unavoidable to some degree due to FCC (Federal Communications Commission) limitations on the maximum power output of a clock signal. However, the limitations on power lead to spreading the power signature over a larger spectrum. The noise signals often will not overlap directly with the spectrum of a receiver. However, harmonics of the noise signal may create interference, which may become significant if the receiver is embedded into the platform of a device that includes the clock signal. As used herein, the term "noise" includes both the spectrum of a signal and any harmonics resulting from the signal. Thus, the harmonics of an FM spread clock may provide significant interference to, for example, the WLAN 2.4 Ghz frequency band.

The characteristics of FM spread clock platform noise may include:

(1) Interference that includes harmonics of the clock frequency.

(2) Due to FCC requirements, the spread clock has between 0.25-1.0% frequency spreading of the signal.

(3) The spread clock is frequency modulated, resulting in a dynamic pattern over frequency and time.

(4) If multiple antennas are used for signal reception, the spatial correlation between the multiple antennas is very high because of the inclusion of the receiver in the platform.

In the operation of receiver in a platform having an FM spread clock, the platform noise may appear to be a wideband signal when viewed as an average. However, the characteristics of the signal vary when the signal is viewed against time. For example, harmonics resulting from a clock signal may have a periodic repeating signal that moves in frequency in a repeating pattern. While the noise occupies a wide frequency band averaged over time, the instantaneous interference thus only occupies a narrow band, with the interference moving in a period pattern based on the frequency modulation pattern. For this reason, treating the noise as wideband noise and thus applying static noise weighting using the average power spectrum results in missing the tones causing the interference, while penalizing clear tones. For FM spread clock interference, the instantaneous power spectrum is narrow band, while the average power spectrum over an extended time period is wideband.

In conventional WLAN receivers, it is generally assumed that the noise received is channel noise. Channel noise may be random, and has varied characteristics. The channel noise may be assumed to be white Gaussian noise. However, in contrast platform noise results from aspects of the platform itself, with resulting differences in signal characteristics. With the presence of colored platform noise (which is noise having a certain limited frequency band, as opposed to white noise), radio reception performance may be significantly degraded.

In one particular example, a 12 MHz FM spread clock with modulation frequency 32 KHz does not provide interference for the entire 12 MHz band over, for example, a 3.2 μs OFDM (orthogonal frequency division multiplexing) symbol of 20 MHz bandwidth. Rather, the spread clock interferes with approximately eight subcarriers (2.4 MHz over one 3.2 μs OFDM symbol) and then interferes with approximately eight other subcarriers for the following OFDM symbol. For this reason, the use of average power spectrum as a noise weighting factor will only partially mitigate the interfered tones because the average power level does not reflect the instantaneous power of the interference, and will in addition penalize the tones that are not currently subject to interference. In an embodiment of the invention, rather than utilizing static noise weighting, dynamic noise weighting is applied by tracking the spread clock location over each OFDM symbol.

In an embodiment of the invention, the platform noise power spectrum may be estimated using a short time Fourier transform (STFT), or spectrogram. A short time Fourier transform is used to estimate the power spectrum over two dimensions, frequency and time. In different embodiments, the STFT may be implemented in a chip (in silicon) or may be performed by the host during a protocol idle period. Following the calculation of the platform noise spectrum, the noise may be evaluated to determine the noise characteristics. In an embodiment, in order to determine the period of a noise signal, a certain portion of the signal may be chosen as a template. The template may then be cross-correlated against the remainder of the signal. In addition to other advantages, cross-correlation can be simply embedded into silicon, and thus may optionally be implemented into hardware for a receiver. There generally will be very little correlation in the noise signal, but there will be peaks at the points in the recurring signal matching the template. Therefore, the time between peaks of the signal will represent the period of the noise signal, i.e., the modulation frequency. In one embodiment, the template and the power spectrum over one period then may be stored in a lookup table, which then may be used to conduct frequency tracking and dynamic noise weighting. Because the platform noise generated by a clock would generally be very stable, the loop-up table thus requires infrequent updating. In one embodiment of the invention, because spread spectrum clock estimation requires a significant amount of computation, but is stable over time, the computation can be done sparsely in the host CPU during the protocol idle period.

In an embodiment of the invention, once there is knowledge of the template and spread clock profile, the spread clock may then be tracked to determine where the clock is located in its cycle when an OFDM symbol is detected. In an embodiment of the invention, a simple frequency tracking solution may be implemented, with the frequency tracking requiring minimal additional circuitry. In this embodiment, the cross-correlation between incoming platform noise and the template is performed. Once a peak of the cross correlation is detected, a counter may be set to 1. The counter is incremented one by one with incoming samples and is reset to 1 when the next peak is detected. At the same time, a correlation circuit for OFDM packet detection is also in operation to detect OFDM symbols. Once an OFDM packet is detected, then the cross correlation circuitry for frequency tracking may be turned off for the duration of the packet, with the counter being mapped to the spectrum profile. It is then possible to identify the corresponding power spectrum and to apply dynamic noise weighting to reflect the dynamic nature of the interference.

In an embodiment of the invention, a radio receiver may include the following additional elements:

(1) Cross-correlation circuitry—In one embodiment, the cross-correlation circuitry may be placed before packet detection in the receiver. The cross-correlation circuit tracks the instantaneous frequency of the spread clock. Once OFDM symbols are detected, the cross correlation circuitry may be turned off and the frequency tracking may run open loop for the duration of the packet. In one example, as long as the modulation frequency estimation is accurate to better than 100 ppm (parts per million), the open loop tracking will be accurate to each OFDM tone over the longest 802.11 a/g packet. Using the frequency tracking, dynamic noise weighting over each tone of each OFDM symbol is conducted to mitigate the spread spectrum noise.

(2) Noise weighting circuitry over each tone of each signal may be provided after the FFT (fast Fourier transform) element of the receiver.

A noise signal may not entirely overlap with the spectrum of a receiver band. For example, only a portion of a clock signal may overlap with the spectrum of a WLAN receiver. In an embodiment of the invention, only the portions of the noise signal that overlap are relevant and thus receive any action.

Channel estimation may be critical to WLAN receiver performance since incorrect channel information results in incorrect soft bit calculation. In the presence of spread clock interference, the different sets of subcarriers in long preambles may be corrupted. Therefore, conventional channel estimation provided by averaging two long preambles will result in inaccurate channel estimation of approximately 4.8 MHz. In order to overcome time varying nature of spread clock interference, an effective time domain channel estimation algorithm using MMSE (minimum mean square error) is provided. The received long preamble $Y_i$ right after the FFT is given by:

$$Y_i = H + N_i = G_{FFT} h + N_i \tag{1}$$

where the transmit preamble X is skipped from the equation since it is known and can be normalized by multiplying its conjugate at both sides; the subscript i=1,2 is the index of the long preamble; $N_i$ is the received spread clock interference over the i th long preamble; and $G_{FFT}$ is a 64×L FFT Matrix with the (k,n) entry $g_{FFT}^{kn}=e^{j2\pi(k-1)(n-1)/N}$, where N=64 and L is the length of time domain channel impulse response h=[$h_0 \ldots h_{L-1}$ 0 ... 0] with L≦$L_{CP}$ ($L_{CP}$ is the length of cyclic prefix). H and h denote frequency and time domain channel response, respectively. Since the spread clock interference power of $N_1$ is different from that of $N_2$, averaging two long preambles will result in incorrect channel estimation.

In an embodiment of the invention, the MMSE algorithm, by taking into account noise power difference, provides an effective way to estimate h. Thus the estimated ĥ is given by:

$$\hat{h}=M^H(MM^H+R)^{-1}Y \quad (2)$$

where $M^H$ denotes transposition and conjugate of M, $$M = \begin{bmatrix} G_{FFT} \\ G_{FFT} \end{bmatrix}, R = \begin{bmatrix} \Sigma_1 & 0 \\ 0 & \Sigma_2 \end{bmatrix},$$

and $\Sigma_i$ is a diagonal matrix with the j th diagonal term $\sigma_{ij}^2$ representing the noise power over the j th tone of the i th preamble. In order to reduce computation complexity of matrix inversion in MMSE formula, equation (2) may be converted to:

$$\hat{h} = M^H R^{-H/2}(R^{-1/2}MM^H R^{-H/2} + I_{64})^{-1} R^{-1/2}Y \quad (3)$$
$$= \overline{M}^H (\overline{MM}^H + I_{64})^{-1} \overline{Y}$$
$$= (\overline{M}^H \overline{M} + I_L)^{-1} \overline{M}^H \overline{Y}$$

where $I_L$ is an identity matrix of L-by-L, $\overline{M}=R^{-1/2}M$, and $\overline{Y}=R^{-1/2}Y$, which is the output of dynamic noise weighting. Thus a 128 by 128 inverse reduces to an L-by-L inverse. This estimation can be simplified further by puncturing corresponding tones with high noise power, i.e., puncturing rows in $\overline{M}$ and $\overline{Y}$ with high noise power. It is also noted that the MMSE weight is independent of the channel, and only depends on the spread clock tracking. Therefore, a series of MMSE weight values can be precalculated and stored. Once ĥ is estimated, the frequency domain channel response H can be obtained by conducting FFT on ĥ.

In an embodiment of the invention, if accurate channel information and an accurate power spectrum of spread clock over each OFDM symbol are provided, then dynamic noise weighting can be used to mitigate the impact of spread clock interference. Dynamic noise weighting can be conducted in several places in a device or system. In a first option, dynamic noise weighting can be provided immediately after FFT, i.e., the system y=hx+n over one tone of an OFDM symbol becomes $$\frac{y}{\sigma} = \frac{h}{\sigma}x + \frac{n}{\sigma},$$

where the tone and symbol indexes are skipped and σ0 is different for each tone of each OFDM symbol. Thus, the estimated channel over each tone of each symbol also needs to be weighted by the corresponding σ. In an embodiment of the invention, the remaining blocks of the device may remain unchanged from a conventional receiver. In a second option, the noise weighting can be provided immediately after channel estimation. In this case, the corresponding noise power $\sigma^2$ divides the estimated channel for each tone of each OFDM symbol. In a third option, noise weighting can be conducted in soft bit computation, i.e., the soft bit is divided by the corresponding noise power $\sigma^2$ over each tone of each OFDM symbol. Each option may result in slightly different performance depending on the equalization and soft bit calculation algorithm used in current Wi-Fi receivers. The computation complexity of noise weighting can be reduced by conducting binary bit shift or tone puncturing, as discussed above.

In an embodiment of the invention, cross-correlation frequency tracking, time domain MMSE channel estimation, and dynamic noise weighting algorithms are implemented in a WLAN receiver to mitigate the spread clock interference and improve the WLAN receive performance in the presence of FM spread clock induced interference. While the present application generally refers to a radio receiver, it will be apparent to those of skill in the art that embodiments of the invention are not limited to this, and that embodiments of the invention may also be implemented in transceivers or other devices having multiple functions.

Figure 1:
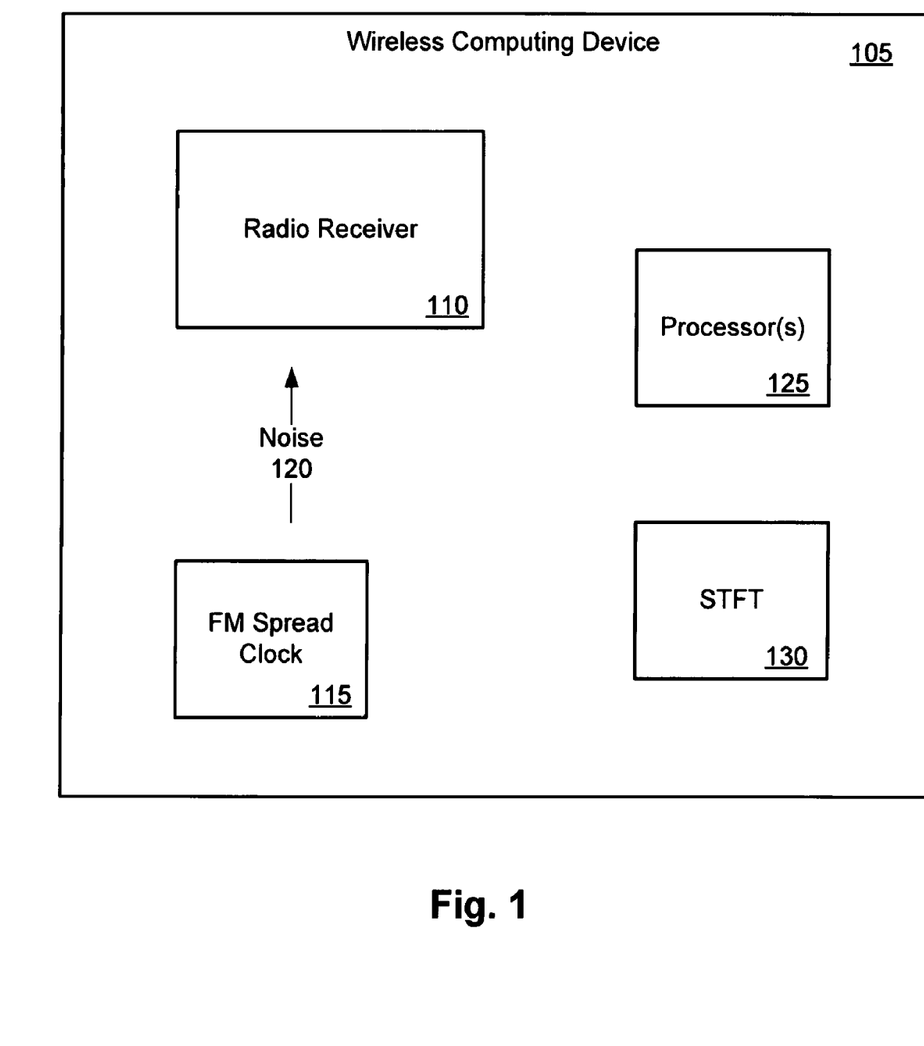
FIG. 1 is an illustration of an embodiment of a wireless device including an embodiment of the invention.

FIG. 1 is an illustration of an embodiment of a wireless device including an embodiment of the invention. In this illustration, a device such as a wireless computing device 105 includes an embedded radio receiver 110. The receiver 110 may, for example, be a WLAN receiver. The radio receiver 110 is embedded into the platform of the device 105 and thus will potentially receive platform noise interference. In particular, the device 105 includes an FM spread clock 115. The clock 115 will create noise 120, including harmonics that can significantly interfere with the performance of the radio receiver 110. The noise can be expected to be dynamic in frequency, affecting only certain symbols in transmission at any point in time.

In an embodiment of the invention, the device 105 provides dynamic mitigation to the dynamic noise 120 provided by the FM spread clock 115. The mitigation may include performing a time-spectrum characterization of the platform noise; tracking the noise signal using cross-correlation; estimating the time domain channel affected; and providing dynamic noise weighting to counter the dynamic noise signal. The time-spectrum characterization may be provided by a special purpose short time Fourier transform 130 that is provided in silicon, or by a general purpose processor or processors 125.

Figure 2:
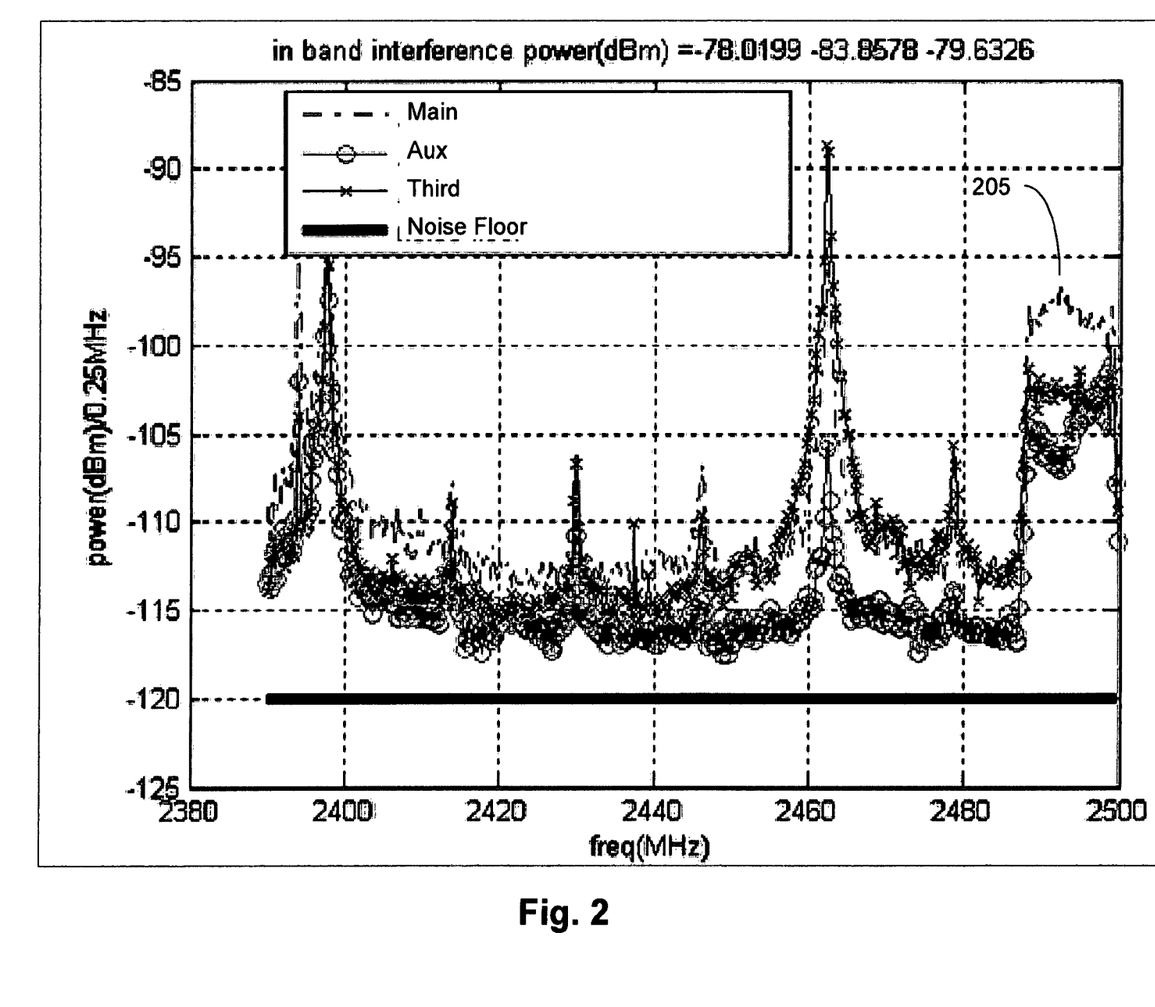
FIG. 2 is an illustration of band interference power as encountered by a wireless computing device.
Figure 3:
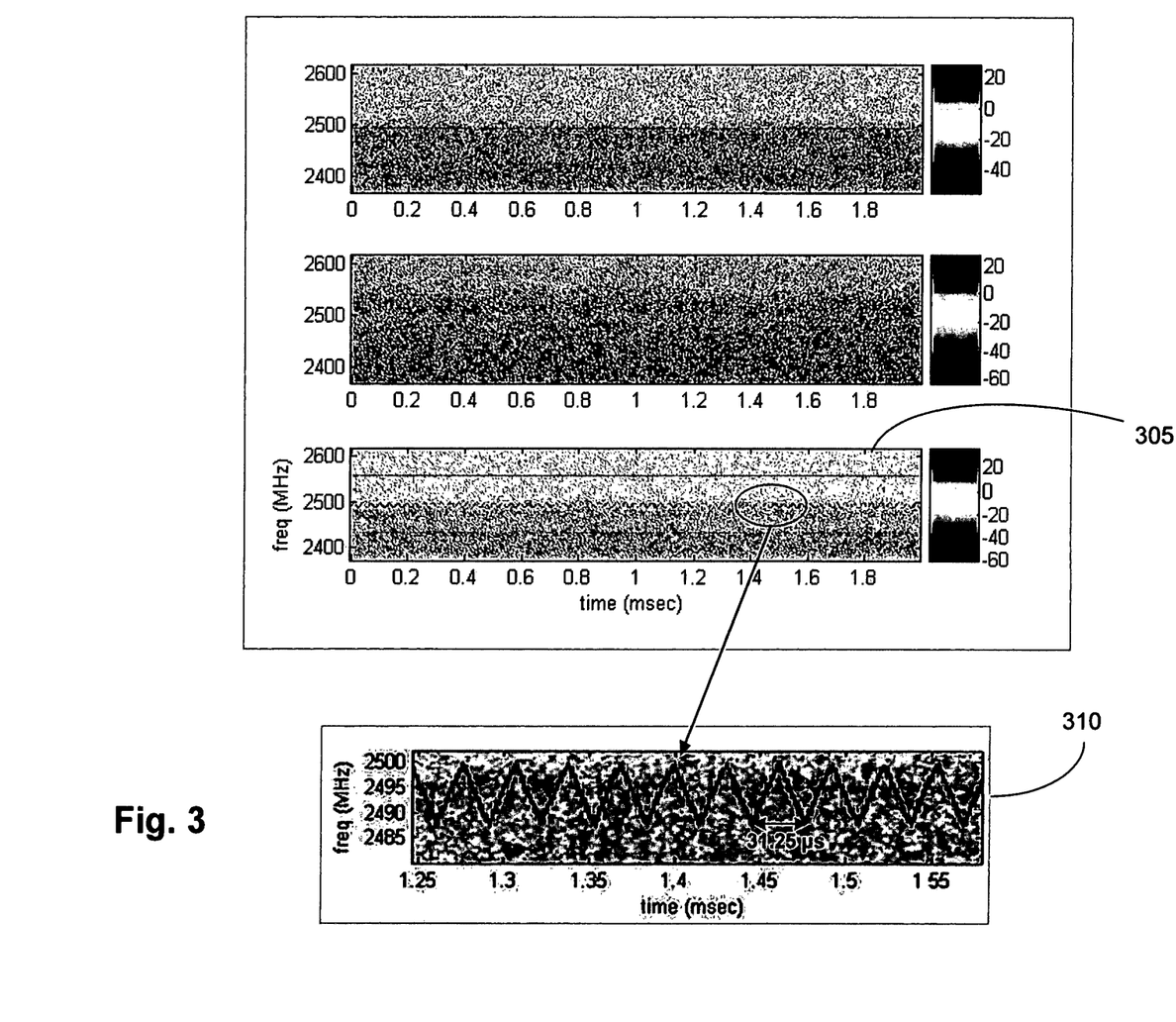
FIG. 3 illustrates a spectrogram of noise received by a wireless computing device.

FIG. 2 is an illustration of band interference power as encountered by a wireless computing device. The frequencies shown reflect the 2.4 GHz band. As shown, it appears that there is a wide band of interference 205 occurring. However, the appearance of the noise as an average may be deceiving. FIG. 3 illustrates a spectrogram of noise received by a wireless computing device. As shown in the spectrogram 305, there is a saw-tooth pattern to the noise, which is apparent when the image is magnified 310. Thus rather than a wideband of noise, it is apparent the noise is a narrow band of noise that changes frequency over time in a repeating pattern with a signal length of 31.25 μs. In an embodiment of the invention, the noise is dynamically mitigated to provide noise weighting that is appropriate for the noise pattern.

Figure 4:
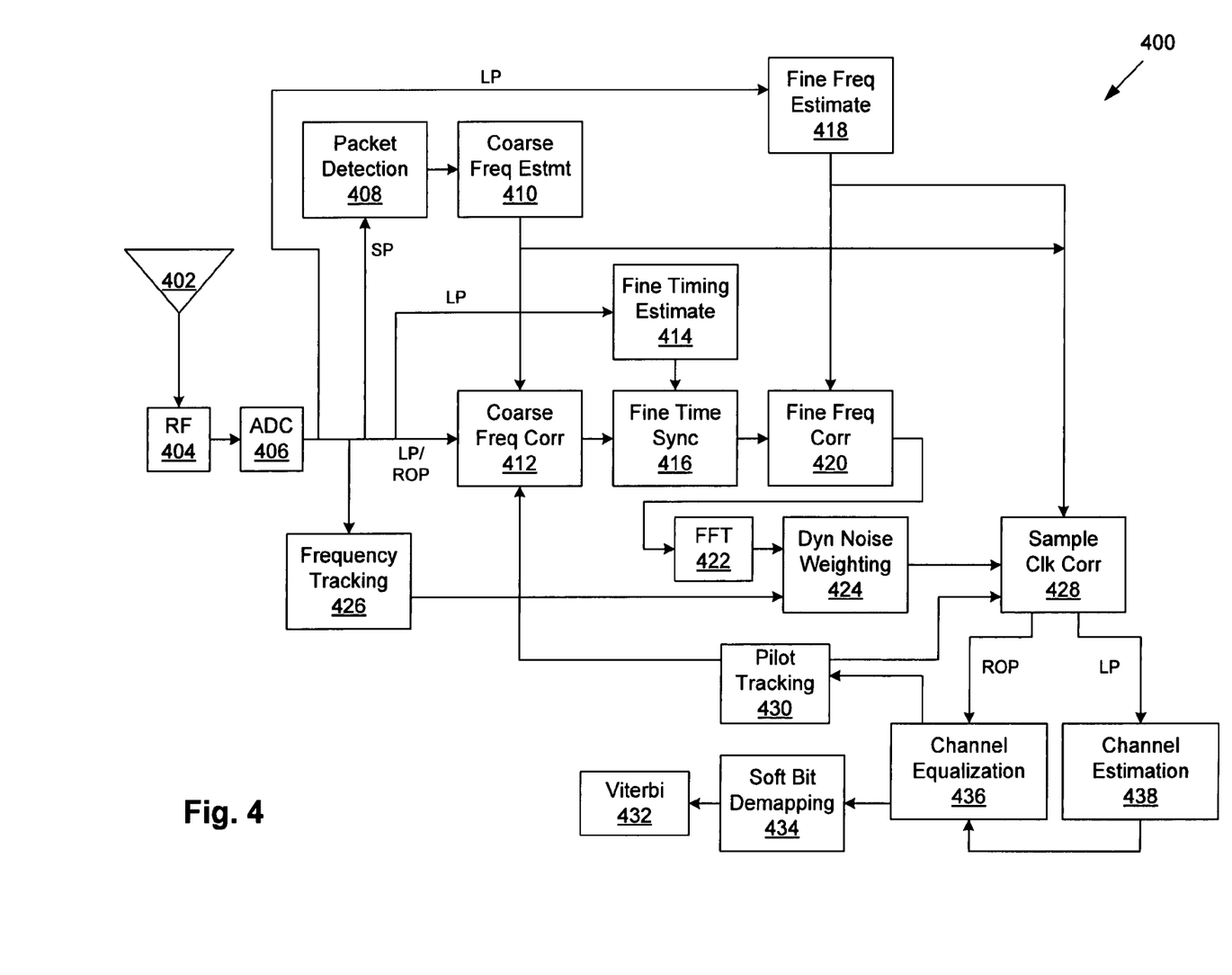
FIG. 4 is illustrates an embodiment of the architecture of a receiver.

FIG. 4 is illustrates an embodiment of the architecture of a receiver. In one embodiment, an architecture for a Wi-Fi (802.11a/g) receiver 400 implements spread clock interference mitigation algorithms. The receiver includes an antenna 402 (or multiple antennas) and an RF (radio frequency) section 404. Those of skill in the art will recognize that that the antenna/RF block can represent multiple RF chains. The receiver further includes an ADC (analog to digital converter) 406 to convert the received data for processing. In the illustrated architecture, four important estimation functions are conducted in the time domain: packet detection 408, coarse frequency estimation 410, fine timing estimation 414, and fine frequency estimation 418. These functions may be referred to generally as data acquisition. This is due to the random access nature of the MAC. In this architecture, the NIC (network interface card) spends a significant amount of time waiting or checking for data packets. Data acquisition is then most efficiently accomplished in the time domain. The coarse frequency estimation 410 and the data from the ADC 406 are presented to the coarse frequency correction 412. The coarse frequency correction 412 and the fine timing estimate are input for the fine time synchronization 416, which is input with the fine frequency estimate 418 to the fine frequency correction 420. The fine frequency correction 420 is presented to a fast Fourier transform block 422, with the result being received by a dynamic noise weighting block 424. Also input to the dynamic noise weighting block 424 is the output of a frequency tracking element 426. In an embodiment of the invention, the dynamic noise weighting block 424 is intended to provide noise weighting that responds to the dynamic noise encountered by the receiver. The dynamic noise weighting 424, the fine frequency estimate 418, and the coarse frequency estimate 410 are providing a sample clock correction element, which results in channel equalization 436 and in channel estimation 438 for dynamic noise mitigation. The channel equalization 436 receives input from the channel estimation 438 and the sample clock correction 428, which results in soft bit demapping 434 and the Viterbi decoder operation 432, and provides feedback to pilot tracking 430.

Figure 5:
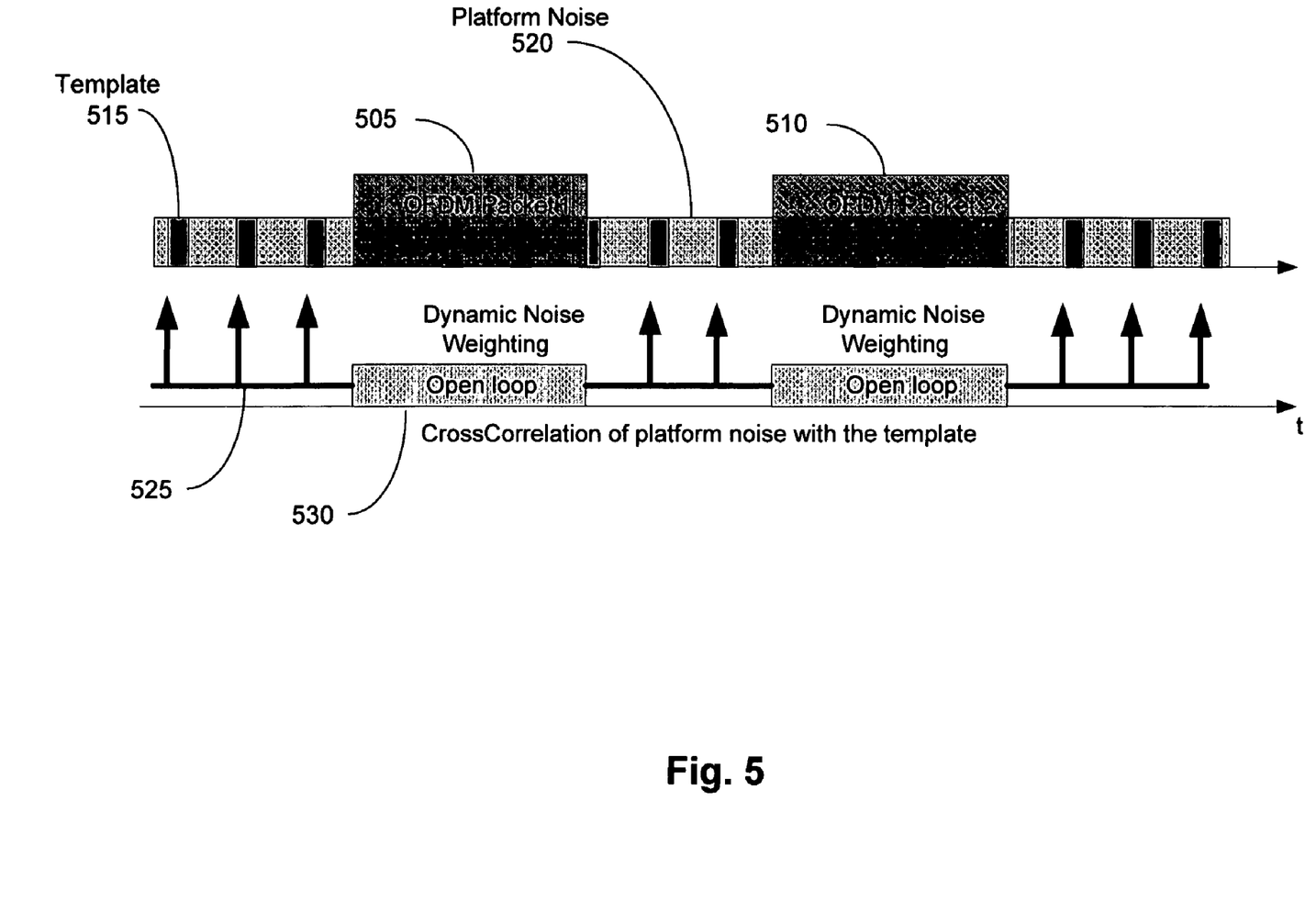
FIG. 5 is an illustration of an embodiment of frequency tracking and dynamic noise weighting.

FIG. 5 is an illustration of an embodiment of frequency tracking and dynamic noise weighting. In this illustration, multiple OFDM packets, shown as packet 1 505 and packet 2 510, are received. There is platform noise 520 interfering with the receiver operation, with the noise 520 including noise generated by harmonics from an FM clock. A template 515 is chosen and used to cross-correlate with the platform noise 520, which results in peaks 525 that can be used to determine the period of the clock noise. The template is used to track the frequency moving by conducting cross-correlation between incoming interference and the template. Once the OFDM packet 505 is detected, frequency tracking can be turned off and only open loop tracking is needed 530 for the duration of the packet. In an embodiment of the invention, dynamic noise weighting is conducted over each tone of each OFDM symbol based on the spread clock profile. In embodiments of the invention, operations regarding the spread clock profile estimation, including power spectrum over one period, the modulation frequency, and the template may conducted in the device or may be conducted by the host CPU during protocol idle period. Frequency tracking and dynamic noise weighting may be conducted in silicon for the device.

Figure 6A:
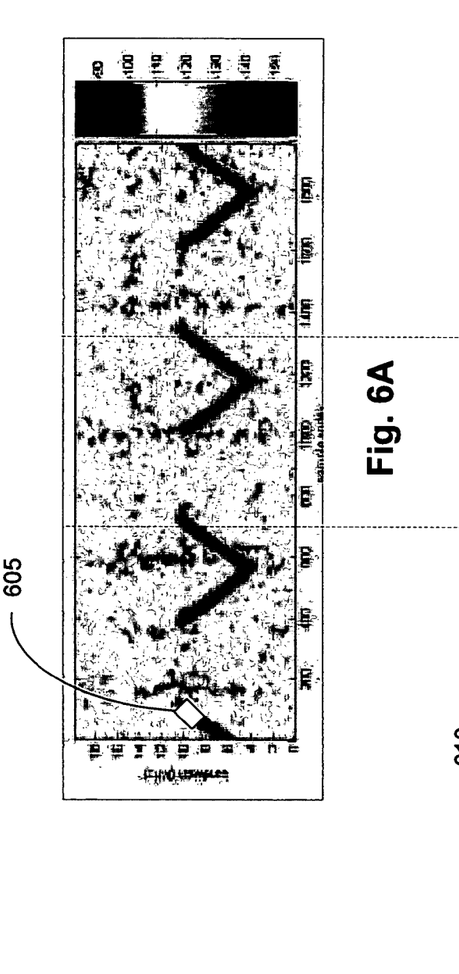
FIG. 6a is an illustration of clock signal interference tracked in an embodiment of the invention.
Figure 6B:
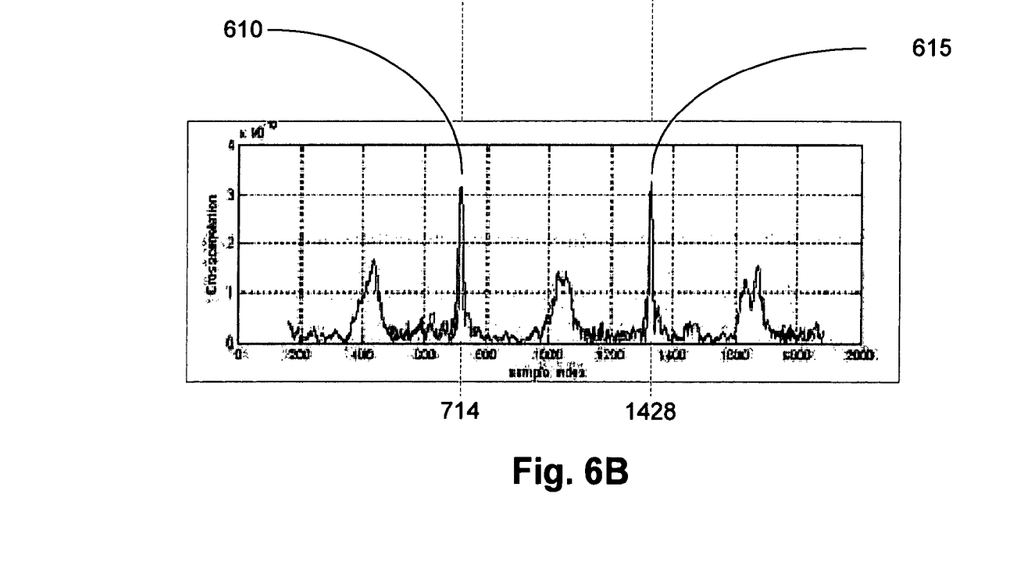
FIG. 6b illustrates the cross-correlation of clock noise in an embodiment of the invention.

FIG. 6a is an illustration of clock signal interference tracked in an embodiment of the invention. In this example, the spread clock noise trace is captured over channel 14 (2.474-2.494 GHz). A template 605 is chosen from the noise trace signal. In this example, a template of 32 or more time samples is chosen, and the peaks of the resulting cross-correlation between the noise trace and template may be used to identify the period of the FM spread clock. FIG. 6b illustrates the cross-correlation of clock noise in an embodiment of the invention. The two peaks in FIG. 6b, first peak 610 and second peak 615, are 714 samples apart, each sample being 50 ns. Thus, the modulation frequency=1/(714*50 ns)=32 KHz, where 64 point cross-correlation is used. Taking a 300 ms long noise trace, estimation of modulation frequency to 100 ppm may be obtained. Once the modulation frequency is identified, the power spectrum beginning with the template over one period can be stored in a lookup table as the spread clock profile that is used for dynamic noise weighting in the demodulation stage.

Figure 7:
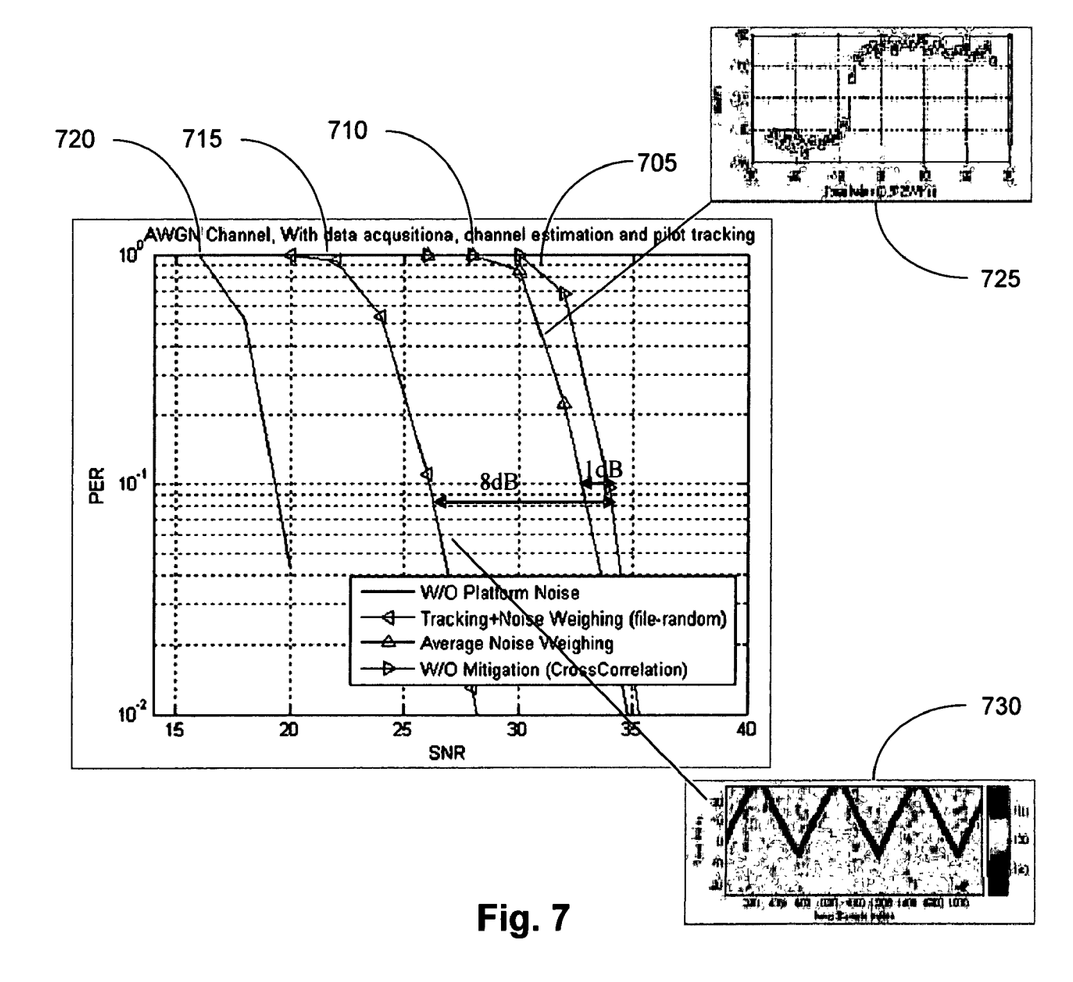
FIG. 7 illustrates packet error rates in an embodiment of the invention.

FIG. 7 illustrates packet error rates in an embodiment of the invention. FIG. 7 is a simulation result using cross-correlation frequency tracking, MMSE (minimum mean square error) time domain channel estimation, and dynamic noise weighting provided immediately after the FFT process. FIG. 7 shows the packet error rate (PER) performance using 54 Mbps mode over an AWGN (additive white Gaussian noise) model channel with the added platform noise, as captured by a device (a laptop computer including WLAN) over a 20 MHz wide band (2.48-2.5 GHz). The illustrated simulation considers the entire receiver performance, including packet detection, frequency error estimation, symbol synchronization, channel estimation, pilot tracking, and demodulation. FIG. 7 illustrates the performances without any platform noise solution 705, with a solution treating the noise as a wideband flat noise 710 (as shown by the average noise characterization 725), and an embodiment of a dynamic noise weighting solution 715 (as shown by the time characterization of the noise 730). Also shown is the curve for operation without any platform noise 720. As shown, treating the spread clock interference as wideband flat noise and conducting static noise weighting using average noise power 710 provides only a 1 dB gain over the case without any platform noise mitigation solution 705. However, in an embodiment of the invention providing a dynamic solution using frequency tracking and dynamic noise weighting 715, 8 dB gain is achieved. The simulation illustrates the effectiveness of dynamic noise weighting to mitigate the spread clock interference.

Figure 8:
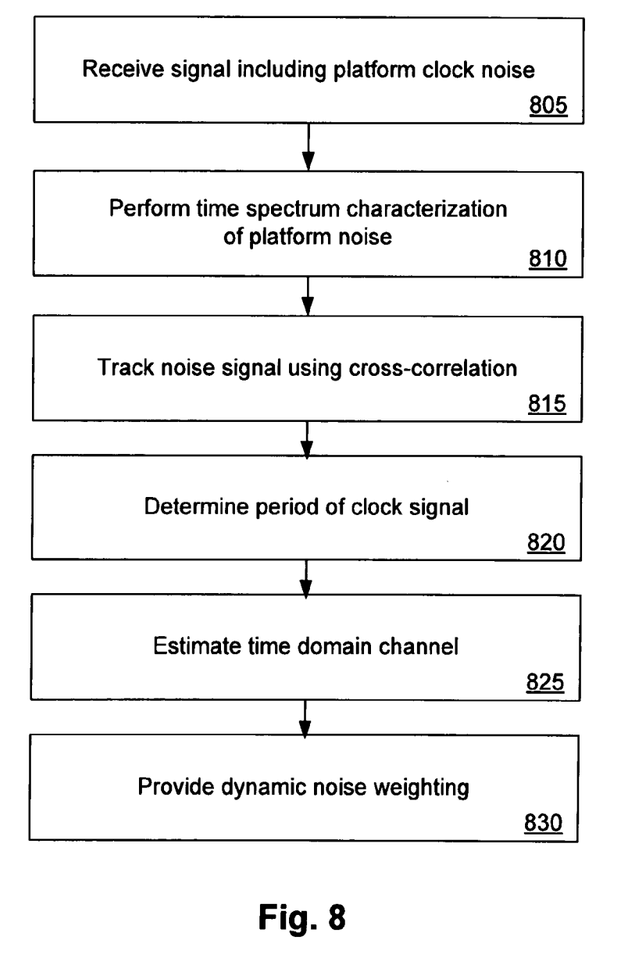
FIG. 8 is a flowchart to illustrate an embodiment of clock noise mitigation.

FIG. 8 is a flowchart to illustrate an embodiment of clock noise mitigation. In this illustration, a wireless signal is received 805. The signal includes noise introduced by a clock present on the platform. Clock is an FM spread clock, and thus the interference created will move in frequency over time, providing an average wideband noise signature that is actually a narrowband signal at a point in time. The signal thus may interfere with different symbols over time. A time-spectrum characterization of the platform noise is performed 810. The characterization may be performed as a STFT (generating a spectrogram). The noise signal is then tracked using cross-correlation 815. For example, a segment of the noise signal may be chosen as a template which is then cross-correlated with the remainder of the signal. The tracking of the noise signal provides providing a measurement of the period of the clock signal 820. An estimate is then made of the time domain channel to allow proper response to the signal 825. Based on the determinations, dynamic noise weighting is provided to counter the dynamic clock noise signal 830.

Figure 9:
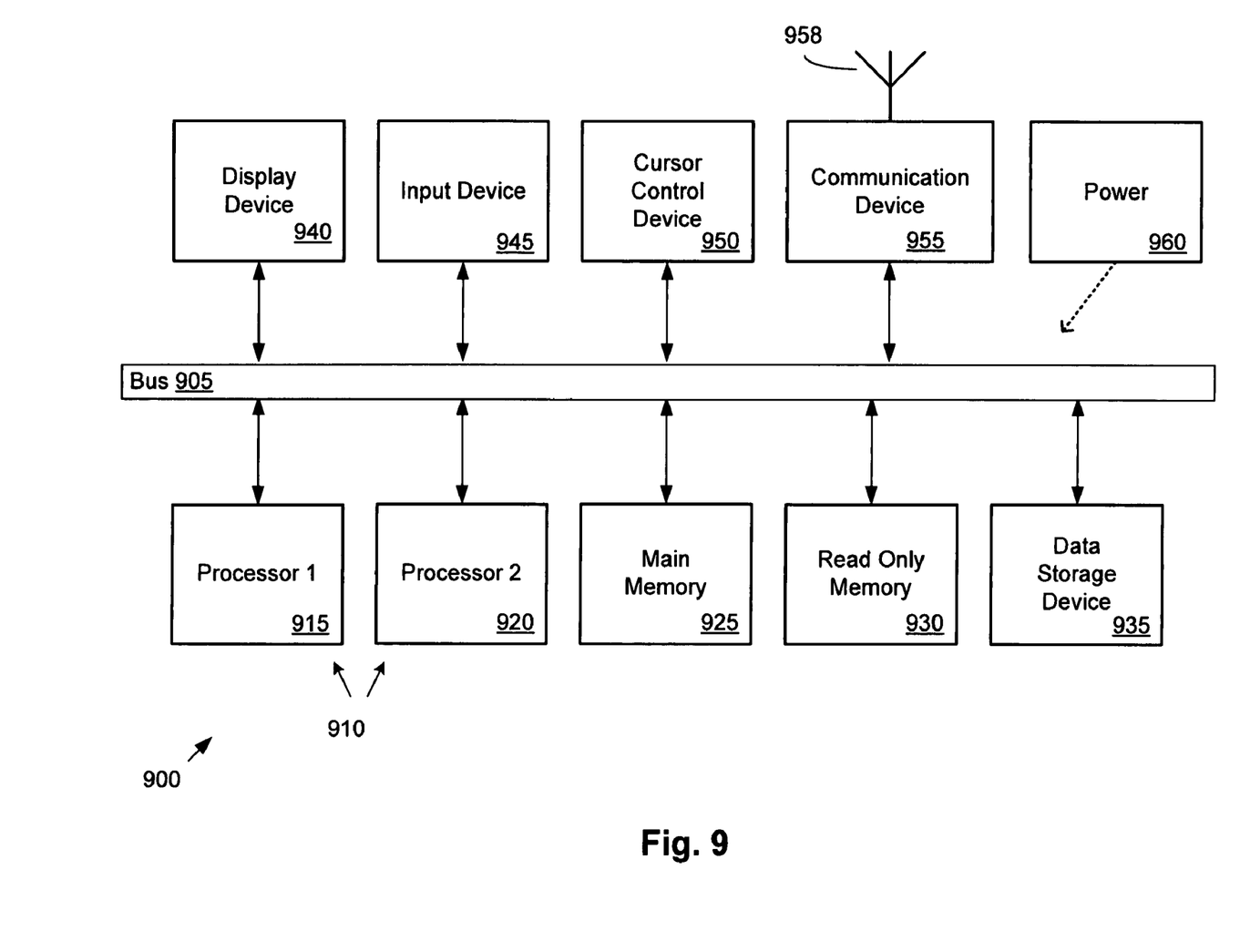
FIG. 9 is an illustration of a computer system for an embodiment of the invention.

FIG. 9 is an illustration of a computer system for an embodiment of the invention. Certain standard and well-known components that are not germane to the present invention are not shown. Under an embodiment of the invention, a computer 900 comprises a bus 905 or other communication means for communicating information, and a processing means such as two or more processors 910 (shown as a first processor 915 and a second processor 920) coupled with the bus 905 for processing information. The processors 910 may comprise one or more physical processors and one or more logical processors. Further, each of the processors 910 may include multiple processor cores. The computer 900 is illustrated with a single bus 905 for simplicity, but the computer may have multiple different buses and the component connections to such buses may vary. The bus 905 shown in FIG. 9 is an abstraction that represents any one or more separate physical buses, point-to-point connections, or both connected by appropriate bridges, adapters, or controllers. The bus 905, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements) In an embodiment of the invention, the processors 910 may be used to process and mitigate received dynamic platform noise.

The computer 900 further comprises a random access memory (RAM) or other dynamic storage device as a main memory 925 for storing information and instructions to be executed by the processors 910. Main memory 925 also may be used for storing temporary variables or other intermediate information during execution of instructions by the processors 910. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). The uses of the main memory may include the storage of data related to the mitigation of dynamic platform noise. The computer 900 also may comprise a read only memory (ROM) 930 and/or other static storage device for storing static information and instructions for the processors 910.

A data storage device 935 may also be coupled to the bus 905 of the computer 900 for storing information and instructions. The data storage device 935 may include a magnetic disk or optical disc and its corresponding drive, flash memory or other nonvolatile memory, or other memory device. Such elements may be combined together or may be separate components, and utilize parts of other elements of the computer 900.

The computer 900 may also be coupled via the bus 905 to a display device 940, such as a cathode ray tube (CRT) display, a liquid crystal display (LCD), a plasma display, or any other display technology, for displaying information to an end user. In some environments, the display device may be a touch-screen that is also utilized as at least a part of an input device. In some environments, display device 940 may be or may include an audio device, such as a speaker for providing audio information. An input device 945 may be coupled to the bus 905 for communicating information and/or command selections to the processors 910. In various implementations, input device 945 may be a keyboard, a keypad, a touch-screen and stylus, a voice-activated system, or other input device, or combinations of such devices. Another type of user input device that may be included is a cursor control device 950, such as a mouse, a trackball, or cursor direction keys for communicating direction information and command selections to the one or more processors 910 and for controlling cursor movement on the display device 940.

A communication device 955 may also be coupled to the bus 905. Depending upon the particular implementation, the communication device 955 may include a transceiver, a wireless modem, a network interface card, LAN (Local Area Network) on motherboard, or other interface device. The uses of a communication device 955 may include reception of signals from wireless devices. For radio communications, the communication device 955 may include one or more antennas 958. In an embodiment of the invention, the communication device includes a WLAN receiver, the receiver includes processing for the mitigation of dynamic platform noise. In one embodiment, the communication device 955 may include a firewall to protect the computer 900 from improper access. The computer 900 may be linked to a network or to other devices using the communication device 955, which may include links to the Internet, a local area network, or another environment. The computer 900 may also comprise a power device or system 960, which may comprise a power supply, a battery, a solar cell, a fuel cell, or other system or device for providing or generating power. The power provided by the power device or system 960 may be distributed as required to elements of the computer 900.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method for mitigating interference from periodic noise comprising:
   receiving wireless signal data at a radio receiver, the data including a periodic noise signal, the noise varying in frequency over time, wherein the frequency varying is periodic;
   performing a time spectrum characterization of the data that estimates a power spectrum of the data over frequency and time;
   cross-correlating using a cross-correlation circutry of the radio receiver a portion of the time spectrum characterization of the data with all or a larger portion of the time spectrum characterization to determine a period of the periodic noise signal;
   estimating a time domain receive channel that is affected by the periodic noise; and
   providing a dynamic noise weighting using a noise weighting circutry of the radio receiver the periodic noise signal, wherein the dynamic noise weighting tracks the noise signal over each transmitted symbol of the signal.

2. The method of claim 1, wherein the periodic noise occurs over a plurality of different channels, and further comprising estimating the channels affected by the noise at a point in time.

3. The method of claim 2, wherein the wireless signal data comprises orthogonal frequency division multiplexing (OFDM) channels.

4. The method of claim 1, wherein the periodic noise comprises a clock signal.

5. The method of claim 4, wherein the clock signal further comprises a frequency modulated (FM) spread clock signal.

6. The method of claim 1, wherein the portion of the time spectrum is a template and wherein the cross-correlation of the template with all or a larger portion of the time spectrum comprises determining points in the time spectrum that match the template.

7. The method of claim 1, wherein the time spectrum characterization of the periodic noise signal data comprises a short time Fourier transform (STFT).

8. A receiver comprising:
   a signal input to receive signal data for one or more wireless devices, the data including a periodic noise signal that varies in frequency periodically over time;
   a frequency tracking module to track the frequency of the periodic noise through a time spectrum characterization of the data that estimates a power spectrum of the data over frequency and time, wherein the frequency tracking module is to:
      cross-correlate a portion of the time spectrum characterization of the data with all or a larger portion of the time spectrum characterization to determine a period of the periodic noise signal, and
      estimate a time domain receive channel that is affected by the periodic noise; and
   a dynamic noise weighting module to apply weighting to the periodic noise signal, wherein the dynamic noise weighting tracks the noise signal over each transmitted symbol of the signal.

9. The receiver of claim 8, wherein the receiver is a wireless local area network (WLAN) receiver.

10. The receiver of claim 8, wherein the receiver is embedded in a platform of a device.

11. The receiver of claim 10, wherein the periodic noise comprises platform noise of the device.

12. A computer system comprising:
   a communication device to receive wireless signal data;
   a frequency modulated (FM) clock, the clock producing periodic noise that varies in frequency periodically, wherein the periodic noise overlaps at least in part with a frequency range of the communication device;
   an asynchronous dynamic random access memory (SDRAM) to hold wireless device signal data, the data including periodic noise generated by the clock; and
   a processor to process the signal data, wherein the processing includes:
      performing a time spectrum characterization of the data that estimates the power spectrum over frequency and time;
      cross-correlating a portion of the time spectrum characterization of the data with the periodic noise signal to determine a period of the periodic noise signal
      estimating a time domain receive channel that is affected by the periodic noise; and
      applying dynamic noise weighting to the signal data, wherein the dynamic noise weighting tracks the frequency of the periodic noise over time.

13. The computer system of claim 12, wherein the processor is to perform a short time Fourier transform (STFT) on the data to generate a spectrogram image of the data.

14. The computer system of claim 12, wherein the communication device includes a module to perform a short time Fourier transform (STFT) on the data to generate a spectrogram image of the data.

15. The computer system of claim 12, wherein the communication device comprises a wireless local area network (WLAN) receiver.

16. The computer system of claim 12, wherein the periodic noise includes harmonics of the clock signal.

17. A machine readable medium having stored thereon data representing sequences of instructions that, when executed by a machine, cause the machine to perform operations comprising:
   receiving wireless signal data, at a radio receiver a portion the data including periodic noise signal, the noise varying in frequency over time;
   performing a short time Fourier transform of the wireless signal data to generate a time spectrum characterization that estimates the power spectrum over frequency and time;
   cross-correlating using a cross-correlation circuitry of the radio receiver a portion of the time spectrum characterization of the data with all or a larger portion of the time spectrum characterization to determine the period of the periodic noise signal;
   estimating a time domain receive channel that is affected by the periodic noise; and
   dynamically weighting the periodic noise using a noise weighting circuitry of the radio receiver to counter the periodic noise signal, wherein the dynamic noise weighting tracks the noise signal over each transmitted symbol of the signal to mitigate the interference from the noise.

18. The medium of claim 17, wherein the periodic noise occurs over a plurality of different channels, and further comprising estimating which of the channels are affected by the periodic noise at a point in time.

19. The medium of claim 17, wherein the correlation comprises performing a cross correlation of a portion of the periodic noise with the remainder of the wireless signal data.

* * * * *